(12) United States Patent
Chen

(10) Patent No.: US 7,097,027 B1
(45) Date of Patent: Aug. 29, 2006

(54) SCOOP FOR TRANSFERRING GRANULAR MATERIAL

(76) Inventor: Kuen-Yan Chen, No. 48, Hsi-An Street, Feng-Yuan City, Taichung Hsien (TW)

( * ) Notice: Subject to any disclaimer, the term of this patent is extended or adjusted under 35 U.S.C. 154(b) by 0 days.

(21) Appl. No.: 11/149,141

(22) Filed: Jun. 10, 2005

(51) Int. Cl.
*B65G 17/36* (2006.01)
(52) U.S. Cl. .................. 198/713; 198/714; 198/703
(58) Field of Classification Search ............ 198/713, 198/714, 711, 712, 701, 703, 704, 708
See application file for complete search history.

(56) References Cited

U.S. PATENT DOCUMENTS

| | | | |
|---|---|---|---|
| 4,184,585 A | * | 1/1980 | Harvey .................. 198/707 |
| 4,246,999 A | * | 1/1981 | Bryant et al. ............ 198/713 |
| 5,336,417 A | * | 8/1994 | Hannum ................. 198/713 |
| 6,208,908 B1 | * | 3/2001 | Boyd et al. .............. 198/704 |
| 6,471,042 B1 | * | 10/2002 | Van De Dungen et al. . 198/703 |

FOREIGN PATENT DOCUMENTS

DE 3150441 * 6/1983

* cited by examiner

*Primary Examiner*—James R. Bidwell
(74) *Attorney, Agent, or Firm*—Davidson Berquist Jackson & Gowdey, LLP

(57) ABSTRACT

A scoop includes a molded one-piece plastic scoop body having a bottom wall portion and a sidewall portion that extends from the bottom wall portion and that cooperates with the bottom wall portion to confine a material-holding space for holding granular material to be transferred. A metal reinforcing member is provided on the bottom wall portion of the scoop body for strengthening the scoop body.

12 Claims, 8 Drawing Sheets

US 7,097,027 B1

SCOOP FOR TRANSFERRING GRANULAR MATERIAL

BACKGROUND OF THE INVENTION

1. Field of the Invention

The invention relates to a scoop, more particularly for a scoop that is suitable for use when transferring granular material and that has a reinforced structure.

2. Description of the Related Art

Referring to FIG. 1, a conventional transfer apparatus for transferring granular material is shown to include a plurality of scoops 10 on a moving scoop-mounting surface 11 of the same. Each scoop 10 includes a molded one-piece scoop body 101 that confines a material-holding space 102 for holding the granular material (not shown) to be transferred by the transfer apparatus.

The scoop body 101 may be made of plastic or metal. Metal scoop bodies 101 are heavy and expensive. On the other hand, plastic scoop bodies 101 wear out easily at surfaces that confront the material-holding space 102 due to friction with the granular material. Wear of plastic scoop bodies 101 is worse at the open side of the material-holding space 102 due to scooping of the granular material. When the thickness of the plastic scoop body 101 is reduced due to wear, the load that can be carried thereby without breaking becomes lighter. Hence, because plastic scoop bodies 101 have relatively short service lives, frequent stopping of the operation of the transfer apparatus becomes necessary for replacing broken scoops 10.

SUMMARY OF THE INVENTION

Therefore, the object of the present invention is to provide a scoop that is suitable for use in a transfer apparatus for transferring granular material and that has a reinforced yet relatively inexpensive structure.

According to the present invention, a scoop for transferring granular material comprises a molded one-piece plastic scoop body and a metal reinforcing member. The scoop body has a bottom wall portion and a sidewall portion that extends from the bottom wall portion and that cooperates with the bottom wall portion to confine a material-holding space for holding the granular material. The reinforcing member is provided on the bottom wall portion of the scoop body, thereby strengthening the scoop body.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
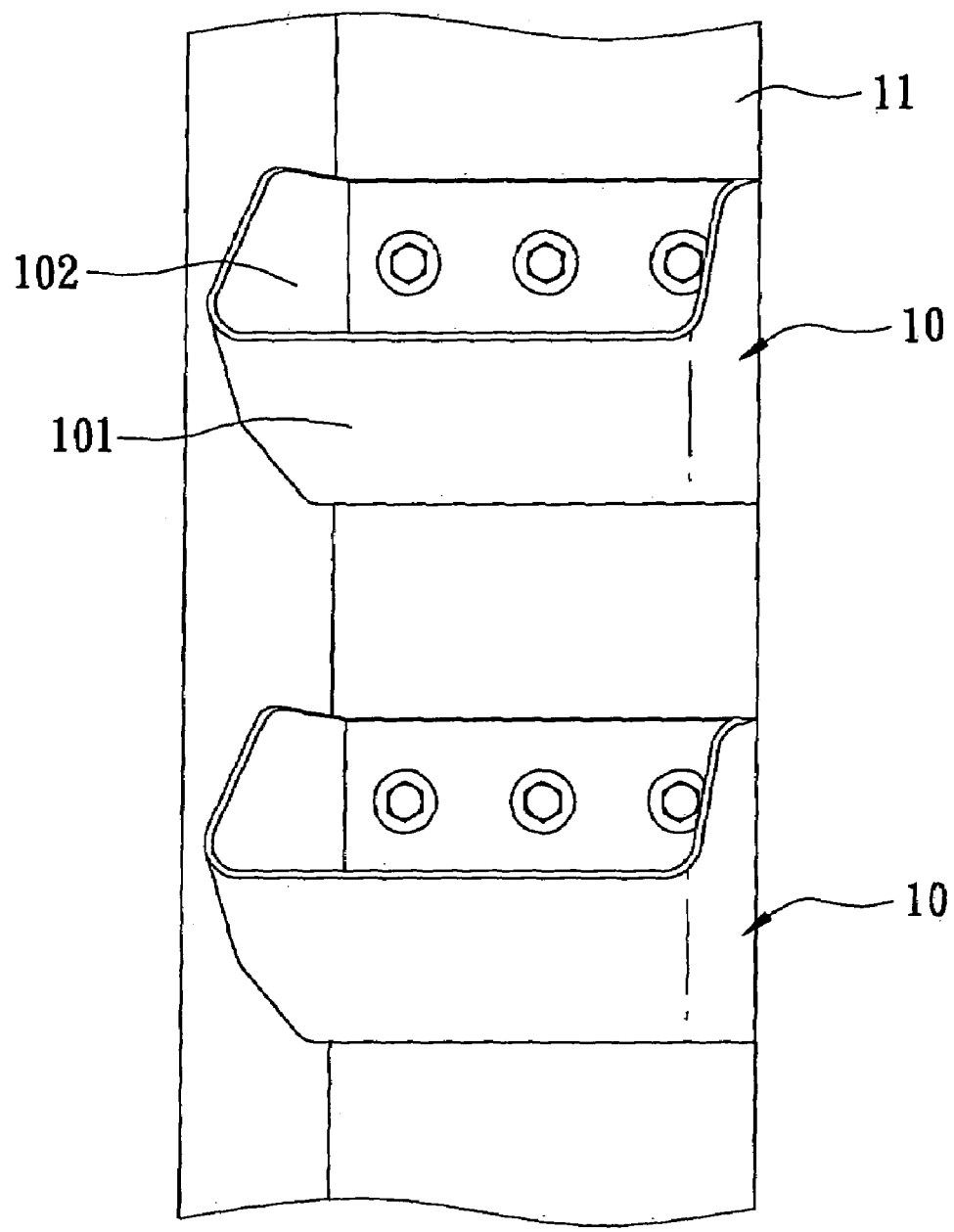
FIG. 1 is a fragmentary perspective view of a transfer apparatus that employs conventional scoops.

Before the present invention is described in greater detail, it should be noted that like elements are denoted by the same reference numerals throughout the disclosure.

Figure 2:
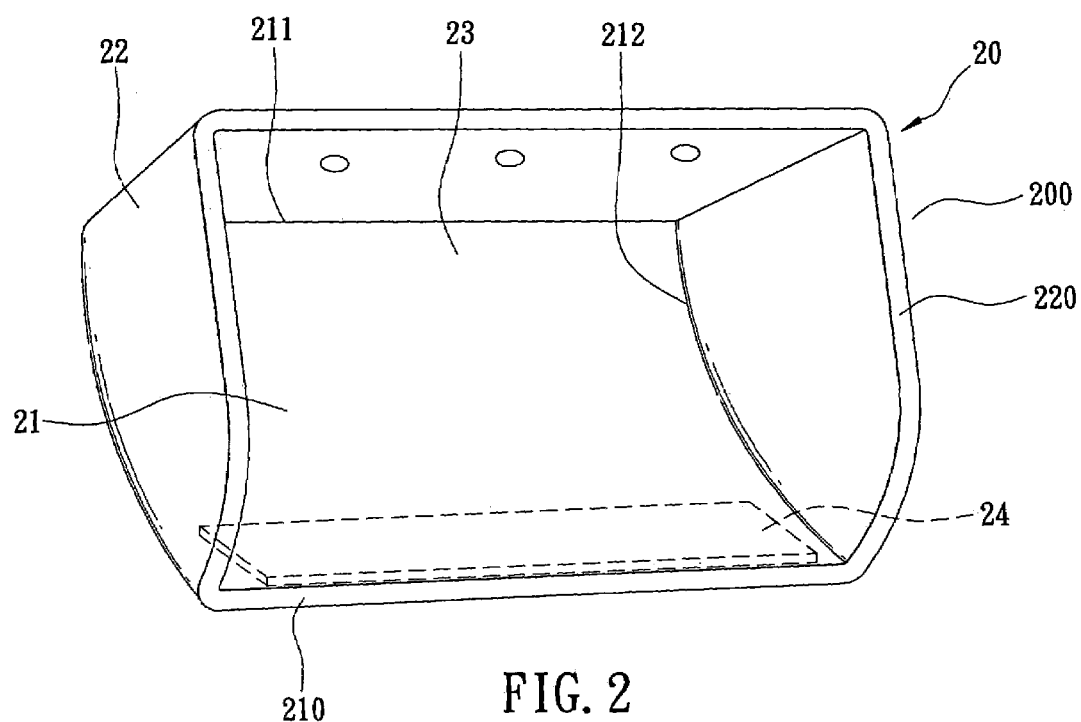
FIG. 2 is a perspective view of the first preferred embodiment of a scoop according to the present invention.
Figure 3:
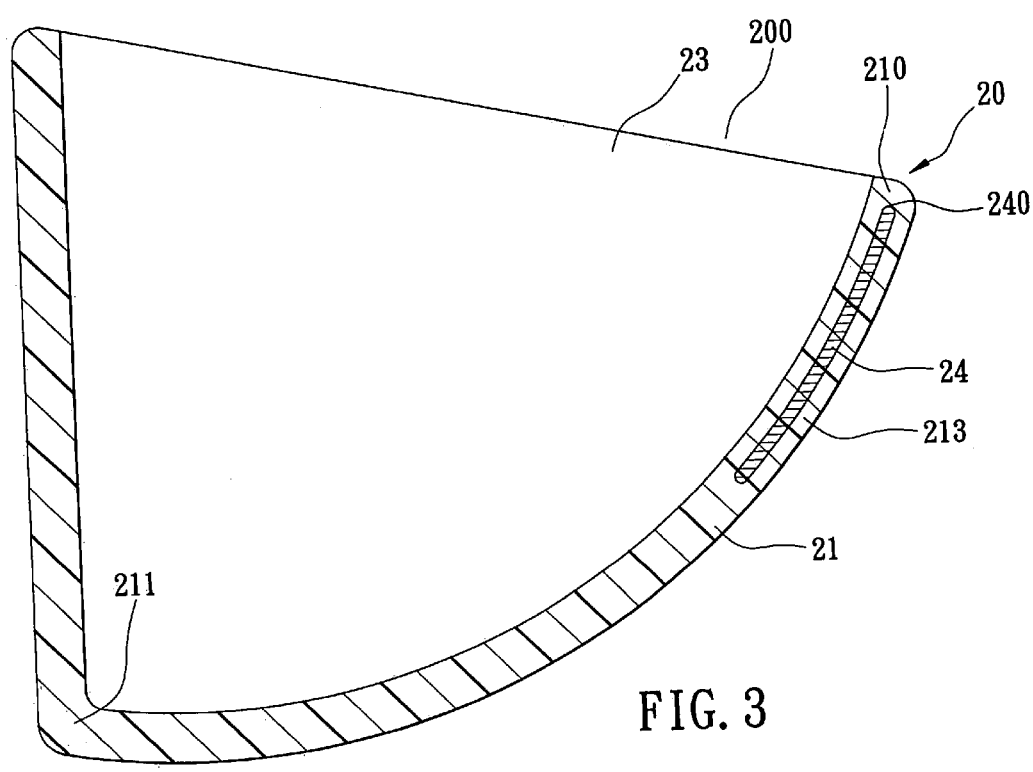
FIG. 3 is a sectional view of the first preferred embodiment.

Referring to FIGS. 2 and 3, the first preferred embodiment of a scoop 20 according to the present invention, which is to be applied to a known transfer apparatus (see FIG. 1) for transferring granular material, is shown to comprise a molded one-piece plastic scoop body 200 and a metal reinforcing member 24.

The scoop body 200 has a bottom wall portion 21 and a U-shaped sidewall portion 22 that extends transversely from a periphery of the bottom wall portion 21 and that cooperates with the bottom wall portion 21 to confine a material-holding space 23 for holding the granular material (not shown). In this embodiment, the bottom wall portion 21 has front and rear edges 210, 211, and curves upwardly from the rear edge 211 to the front edge 210. The bottom wall portion 21 further has opposite lateral edges 212 that extend between the front and rear edges 210, 211. The sidewall portion 22 extends transversely from the bottom wall portion 21 at the rear and lateral edges 211, 212. The front edge 210 of the bottom wall portion 21 and the top edge 220 of the sidewall portion 22 cooperate to define an open side of the material-holding space 23.

In this embodiment, the bottom wall portion 21 includes a leading end segment 213 that has the front edge 210. The reinforcing member 24 is a metal plate that is provided on the leading end segment 213. In particular, the reinforcing member 24 is embedded in the leading end segment 213 of the bottom wall portion 21 in this embodiment. Preferably, the reinforcing member 24 is formed with a rounded edge 240 proximate to the front edge 210 of the bottom wall portion 21.

Figure 4:
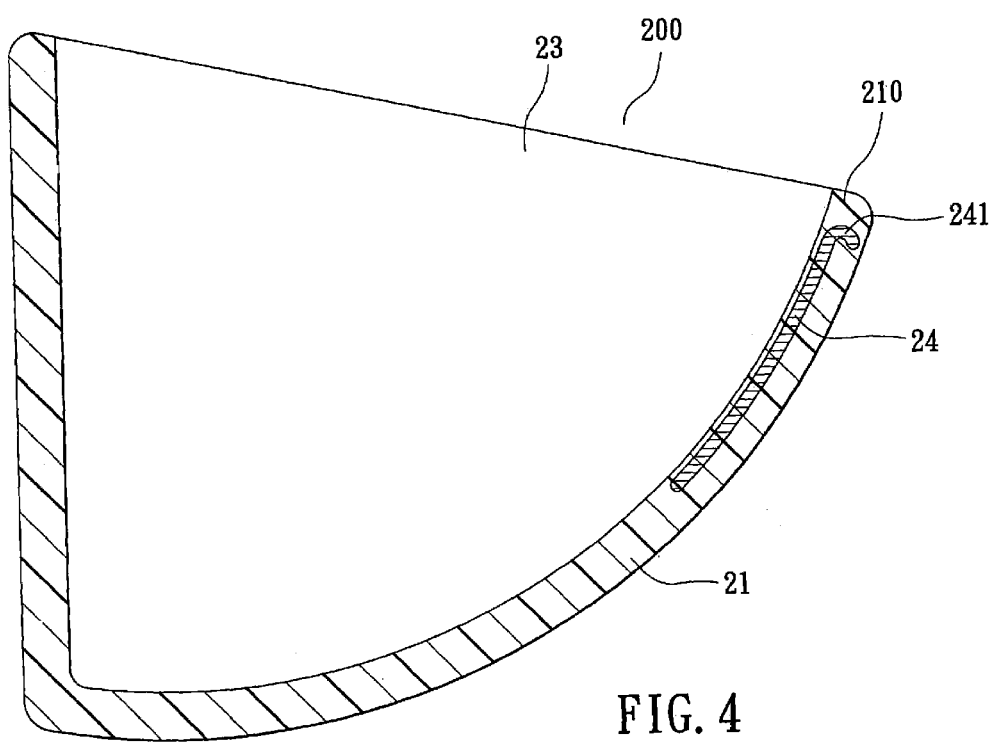
FIG. 4 is a sectional view of the second preferred embodiment of a scoop according to the present invention.

FIG. 4 illustrates the second preferred embodiment of this invention. Unlike the previous embodiment, the reinforcing member 24 is formed with a curved lip 241 proximate to the front edge 210 of the bottom wall portion 21 to strengthen connection between the reinforcing member 24 and the scoop body 200.

Figure 5:
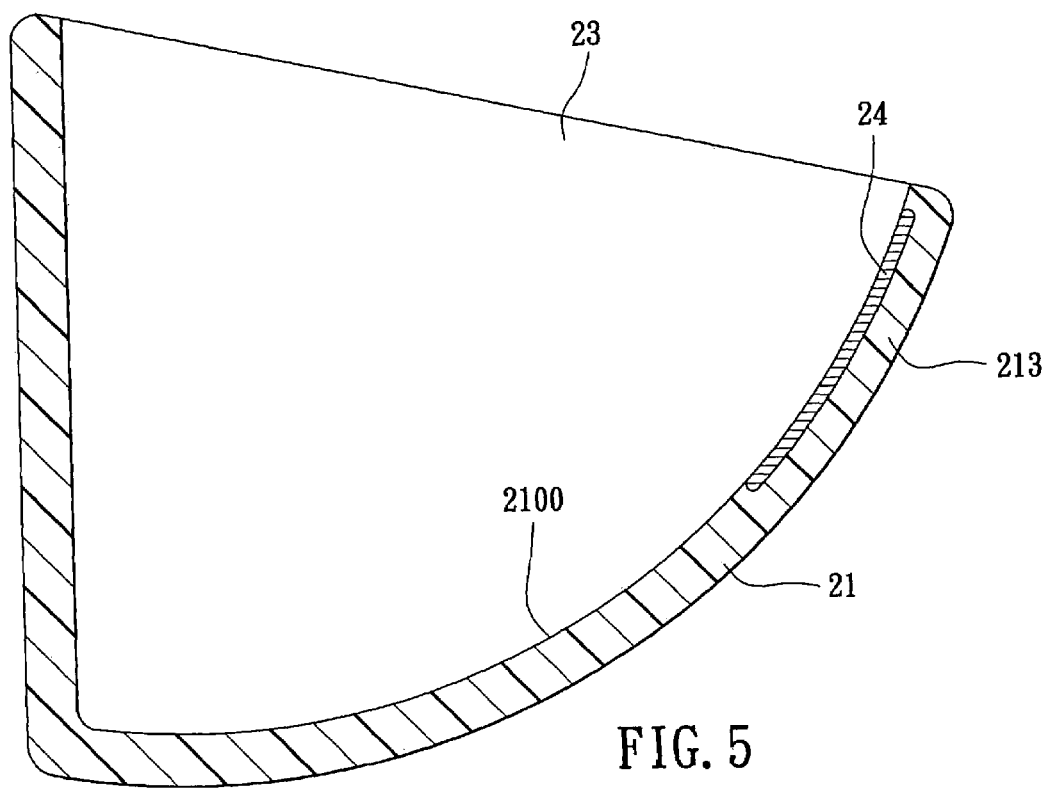
FIG. 5 is a sectional view of the third preferred embodiment of a scoop according to the present invention.

FIG. 5 illustrates the third preferred embodiment of this invention. Unlike the first preferred embodiment, the bottom wall portion 21 has one surface 2100 that confronts the material-holding space 23 and that has the reinforcing member 24, which is in the form of a metal plate, inlaid thereinto.

Figure 6:
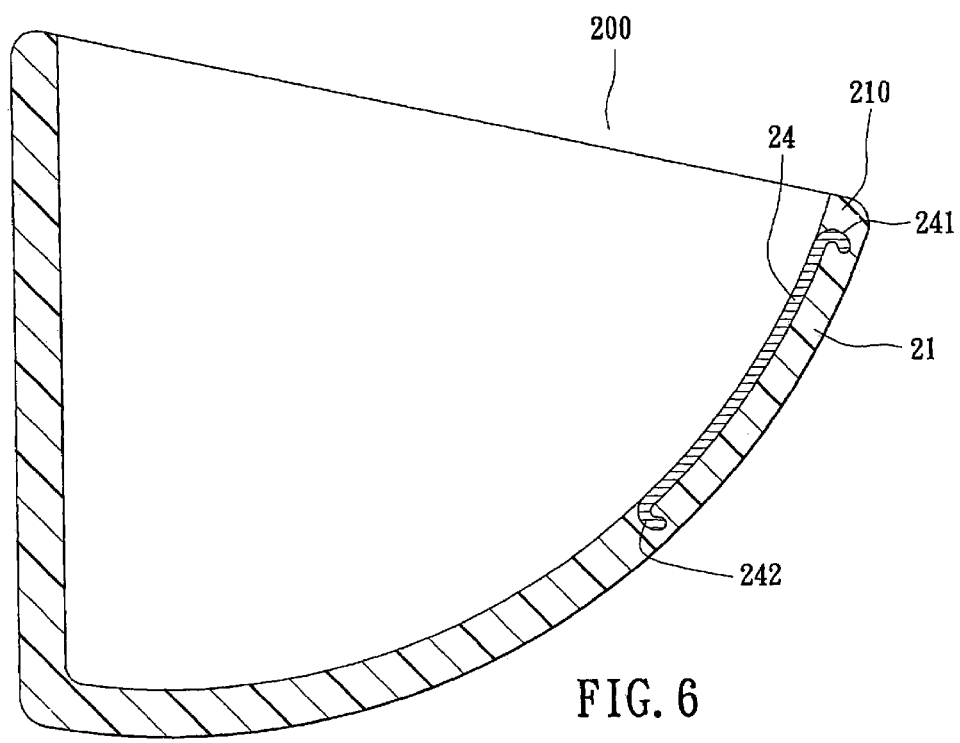
FIG. 6 is a sectional view of the fourth preferred embodiment of a scoop according to the present invention.

FIG. 6 illustrates the fourth preferred embodiment of this invention. Unlike the embodiment of FIG. 5, the reinforcing member 24 is formed with a first curved lip 241 proximate to the front edge 210 of the bottom wall portion 21, and a second curved lip 242 opposite to the first curved lip 241. The first and second lips 241, 242 strengthen connection between the reinforcing member 24 and the scoop body 200.

Figure 7:
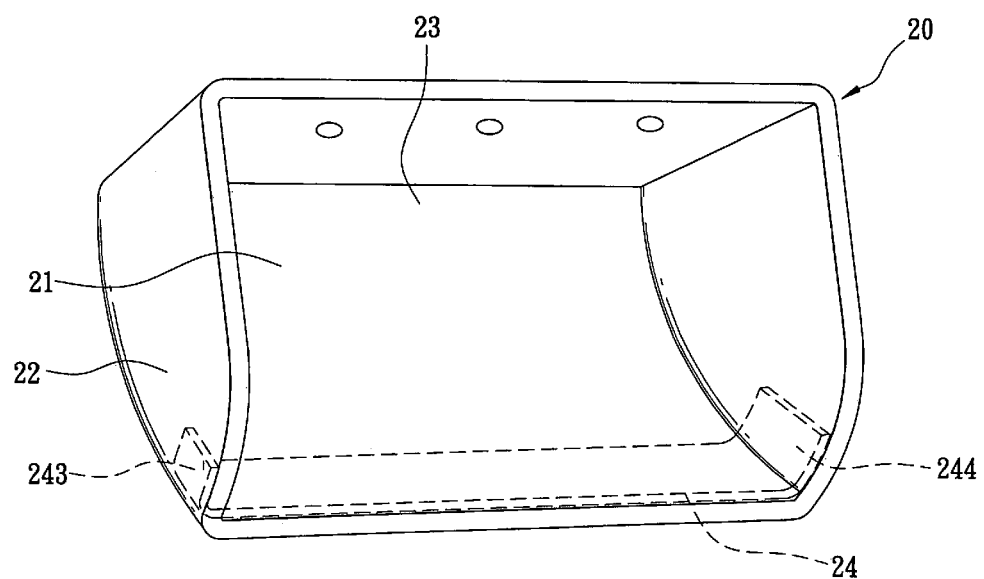
FIG. 7 is a perspective view of the fifth preferred embodiment of a scoop according to the present invention.

FIG. 7 illustrates the fifth preferred embodiment of this invention, which is a modification of the first preferred embodiment. In this embodiment, the reinforcing member 24 is a metal plate having opposite ends 243, 244 that extend respectively into lateral wall parts of the sidewall portion 22 to reinforce the same.

Figure 8:
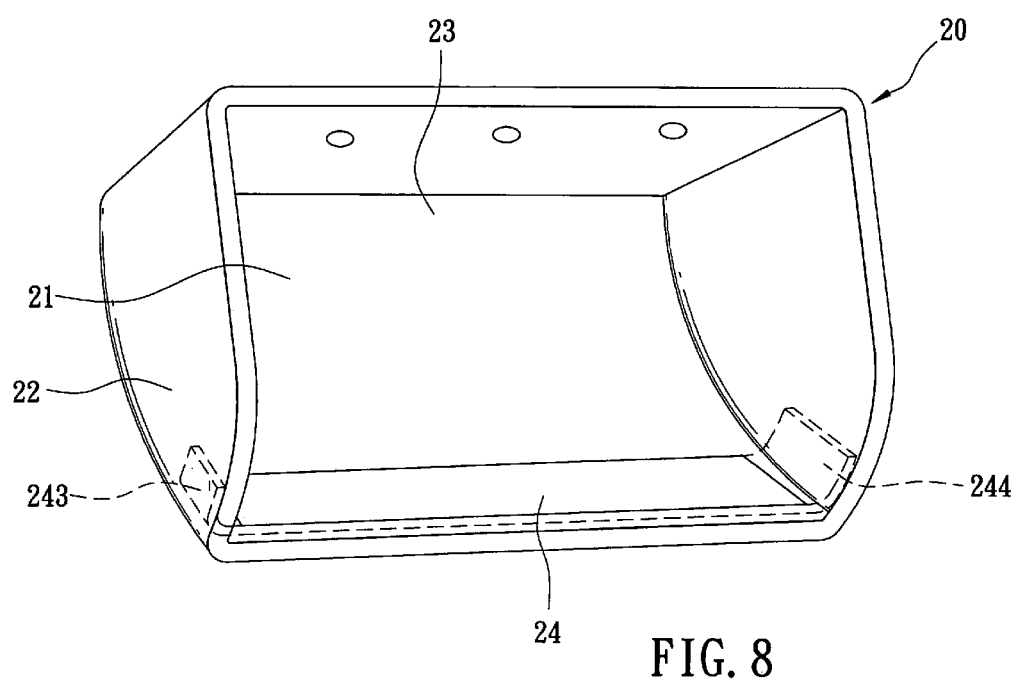
FIG. 8 is a perspective view of the sixth preferred embodiment of a scoop according to the present invention.

FIG. 8 illustrates the sixth preferred embodiment of this invention, which is a modification of the embodiment of FIG. 5. In this embodiment, the reinforcing member 24 is a metal plate having opposite ends 243, 244 that extend respectively into lateral wall parts of the sidewall portion 22 to reinforce the same.

In view of the metal reinforcing member 24 that is provided on at least the bottom wall portion 21 of the plastic scoop body 200, the strength of the scoop body 200 is reinforced such that weakening of the scoop 20 due to friction forces that are generated when filling the material-holding space 23 with granular material can be minimized without the need to form the entire scoop body 200 from metal, thereby resulting in a longer service life for the scoop 20 of this invention at a relatively low cost.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A scoop for transferring granular material, said scoop comprising:
    a molded one-piece plastic scoop body having a bottom wall portion and a sidewall portion that extends from said bottom wall portion and that cooperates with said bottom wall portion to confine a material-holding space for holding the granular material; and
    a metal reinforcing member embedded in said bottom wall portion of said scoop body.

2. The scoop of claim 1, wherein said bottom wall portion has front and rear edges and curves upwardly from said rear edge to said front edge, said bottom wall portion further having opposite lateral edges that extend between said front and rear edges, said sidewall portion extending transversely from said bottom wall portion at said rear and lateral edges.

3. The scoop of claim 2, wherein said bottom wall portion includes a leading end segment that has said front edge, said reinforcing member being embedded in said leading end segment.

4. The scoop of claim 1, wherein said reinforcing member is a metal plate formed with a rounded edge proximate to an edge of said bottom wall portion that defines an open side of said material-holding space.

5. The scoop of claim 2, wherein said reinforcing member is a metal plate that is formed with a rounded edge proximate to said front edge of said bottom wall portion.

6. The scoop of claim 2, wherein said reinforcing member is a metal plate that is formed with a curved lip proximate to said front edge of said bottom wall portion.

7. The scoop of claim 3, wherein said reinforcing member is a metal plate.

8. The scoop of claim 1, wherein said reinforcing member is a metal plate formed with a curved lip proximate to an edge of said bottom wall portion that defines an open side of said material-holding space.

9. The scoop of claim 1, wherein said reinforcing member is a metal plate formed with a first curved lip proximate to an edge of said bottom wall portion that defines an open side of said material-holding space, and a second curved lip opposite to said first curved lip.

10. The scoop of claim 1, wherein said reinforcing member is a metal plate having opposite ends that extend respectively into said sidewall portion.

11. A scoop for transferring granular material, said scoop comprising:
    a molded one-piece plastic scoop body having a bottom wall portion and a sidewall portion that extends from said bottom wall portion and that cooperates with said bottom wall portion to confine a material-holding space for holding the granular material; and
    a metal reinforcing member provided on said bottom wall portion of said scoop body;
    wherein said bottom wall portion has one surface that confronts said material-holding space and that has said reinforcing member inlaid thereinto.

12. The scoop of claim 11, wherein said reinforcing member is a metal plate having opposite ends that extend respectively into said sidewall portion.

* * * * *